United States Patent [19]
Watkins

[11] 3,899,189
[45] Aug. 12, 1975

[54] UNIVERSAL MANUAL DRIVE FOR A WHEELED VEHICLE

[76] Inventor: Mervyn M. Watkins, 30241 Via Borica, Rancho Palos Verdes, Calif. 90274

[22] Filed: Oct. 25, 1974

[21] Appl. No.: 518,079

[52] U.S. Cl. .......................... 280/211; 280/242 WC
[51] Int. Cl.² ............................................. B62M 1/14
[58] Field of Search .................. 280/211, 233, 242 R, 242 WC, 280/249, 250

[56] References Cited
UNITED STATES PATENTS

| | | | |
|---|---|---|---|
| 1,252,430 | 1/1918 | Gruenberg | 280/211 |
| 2,431,112 | 11/1947 | Everest et al. | 280/211 |
| 2,946,602 | 7/1960 | Lee | 280/250 X |

FOREIGN PATENTS OR APPLICATIONS

| | | | |
|---|---|---|---|
| 714,306 | 8/1954 | United Kingdom | 280/242 WC |

*Primary Examiner*—Leo Friaglia
*Attorney, Agent, or Firm*—John Holtrichter, Jr.

[57] ABSTRACT

Inner hand rims are connected to the two drive wheels on a vehicle of the wheel-chair type either directly or through belts, chains or the like. Outer hand rims are mounted adjacent the inner hand rims and are fixed to and connected together by an axle. Couplings then selectively couple the inner hand rims directly to the axle or to the outer hand rims for converting vehicle from two-arm drive to either a one-arm left hand drive or a one-arm right hand drive.

7 Claims, 5 Drawing Figures

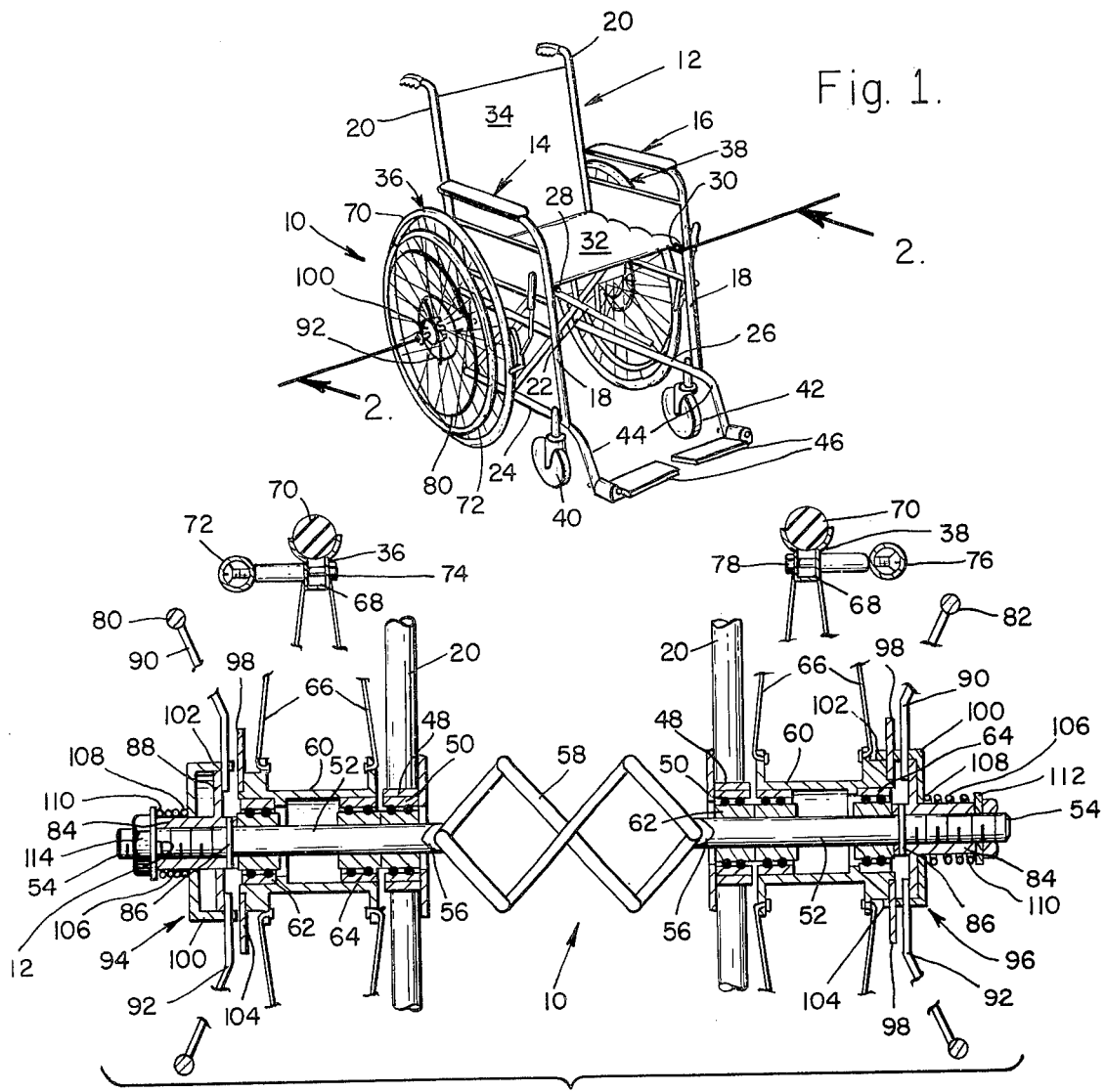

UNIVERSAL MANUAL DRIVE FOR A WHEELED VEHICLE

BACKGROUND OF THE INVENTION

The background of the invention will be set forth in two parts.

1. Field of the Invention

The present invention pertains generally to drives for wheeled vehicles and more particularly to a universal manual drive for a vehicle of the wheel-chair type.

2. Description of the Prior Art

The universal manual drive of the present invention exemplifies improvements over one-arm drives of the type disclosed in U.S. Pat. No. 2,431,112.

SUMMARY OF THE INVENTION

A primary object of the present invention is to provide a new and useful one-arm manual drive for a vehicle having a pair of manually driven wheels.

Another object of the present invention is to provide a device of the type described which includes a pair of inner hand rims connected to the two drive wheels of a vehicle of the wheel-chair type, outer hand rims which are connected together and suitable couplings for selectively coupling the outer hand rims to the drive wheels in such a manner that the vehicle may be converted from a two-arm drive to either a one-arm left hand drive or a one-arm right hand drive.

According to the present invention, a universal one-arm manual drive is provided for a vehicle having a pair of manually driven wheels. The drive includes first and second pairs of inner and outer hand rims, first means mounting the first pair of hand rims on the vehicle in such a position that the first pair of hand rims are accessible to the left hand and arm of an occupant of the vehicle, second means mounting the second pair of hand rims on the vehicle in such a position that the second pair of hand rims will be accessible to the right hand and arm of the occupant, first means connecting the outer hand rims together so that manual rotation of one outer hand rim will rotate the other hand rim, second means connecting one of the inner hand rims to one of the manually driven wheels and the other inner hand rim to the other manually driven wheel for rotation by an associated one of the inner hand rims, first coupling means for selectively releasably coupling the first outer hand rim to the first inner hand rim and second coupling means for selectively releasably coupling the second outer hand rim to the second inner hand rim.

In a first embodiment of the invention, the drive is adapted to directly propel the wheels of the vehicle.

In a second embodiment of the present invention, the drive is adapted to remotely propel the wheels through a mechanical drive connected to the wheels through belts or the like.

The features of the present invention which are believed to be novel are set forth with particularity in the appended claims. The present invention, both as to its organization and manner of operation, together with further objects and advantages thereof, may best be understood by making reference to the following description, taken in connection with the accompanying drawings in which like reference characters refer to like elements in the several views.

BRIEF DESCRIPTION OF THE DRAWINGS

FIG. 1 is a perspective view of a wheel-chair embodying a first embodiment of the present invention;

FIG. 2 is an enlarged, vertical section, with parts being broken away and being taken substantially along the line 2—2 of FIG. 1;

FIG. 3 is a vertical section similar to FIG. 2 showing a second embodiment of the present invention;

DESCRIPTION OF THE PREFERRED EMBODIMENTS

Figure 5:
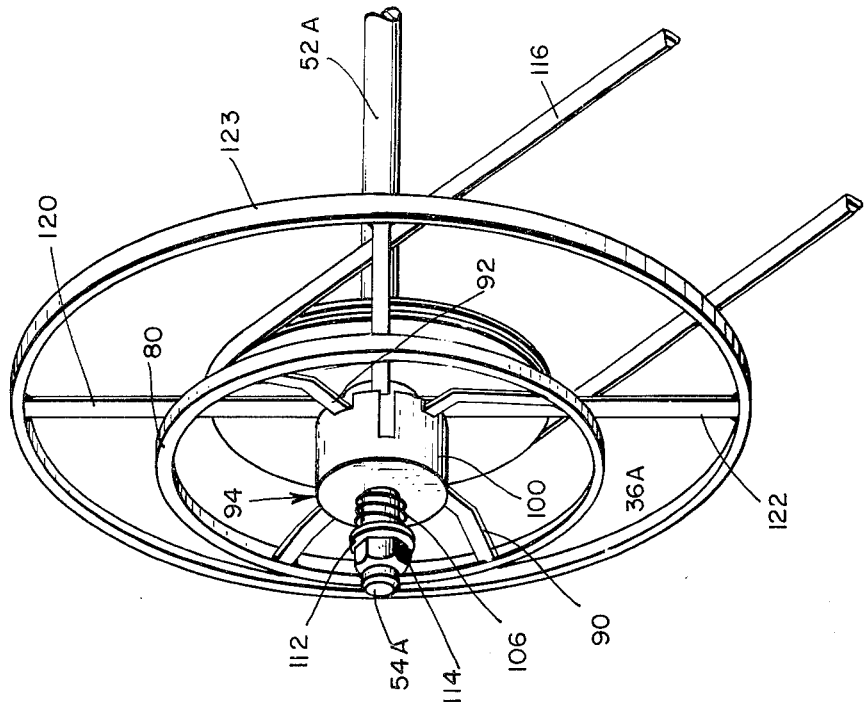
FIG. 5 is a view similar to FIG. 4 showing the parts in a second operating position.

Referring again to the drawings and more particularly to FIGS. 1 and 2, a universal manual drive constituting a first embodiment of the present invention, generally designated 10, is shown in combination with a wheeled vehicle 12.

Vehicle 12 is shown for purposes of illustration, but not of limitation, as comprising a wheel-chair of the folding type which includes a pair of side frames 14, 16 each having front legs 18 and rear legs 20. Frames 14, 16 are connected together by an X-brace 22, the lower ends of which are pivotally connected to bottom rungs 24, 26 on frames 14, 16, respectively. The upper ends of X-brace 22 carry slides 28, 30 which, in turn, carries a flexible seat 32. A flexible backrest 34 connects the upper portions of rear legs 20.

Vehicle 12 also includes a pair of drive wheels 36, 38 and a pair of castor wheels 40, 42. While the drive wheels 36, 38 are shown as being mounted on the rear legs 20, it will be readily understood that they may be mounted on front legs 18 and that castor wheels 40, 42 may be mounted on rear legs 20. Bottom rungs 24, 26 each includes a forward extension 44 which carries a foot rest 46.

Referring now to FIG. 2, each rear leg 20 carries a bearing race 48 into which an axle bearing 50 is press fit. An axle portion 52 is rotatably mounted in each bearing 50 and each axle portion 52 includes an outboard end 54 and an inboard end 56. The inboard end 56 of axle portions 52 are connected together by a lazy-tong-type connector 58 which facilitates folding vehicle 12 without first removing its axle.

The drive wheels 36, 38 each includes a hub 60 rotatably mounted on an axle portion 52 by wheel bearings 62, 64. A plurality of spokes 66 connects each hub 60 to a wheel rim 68 which, in turn, carries a tire 70.

Drive 10 includes a first inner hand rim 72, which is connected to wheel 36 by a bolt 74, and a second inner hand rim 76 which is connected to wheel 38 by a bolt 78. Drive 10 also includes a first outer hand rim 80 which is somewhat smaller in diameter than, and is located closely adjacent, the first hand rim 72 so that hand rim 72, 80, will be accessible to the right hand and arm of an occupant of vehicle 12. Additionally, a second outer hand rim 82 is located closely adjacent the second inner hand rim 76 so that both hand rims 76, 82, will be accessible to the left hand and arm of an occupant of vehicle 12.

The outer hand rims 80, 82 are mounted on the outboard ends 54 of axle portions 52 by a suitable mounting means including a hub 84 keyed to its axle portion 52 by a pin 86. Each hub 84 carries disc 88 to which an associated one of the outer hand rims 80, 82 is connected by a plurality of spokes, like the pair shown at 90, 92. It is apparent that spokes 90, 92 disc 88, hub 84, pin 86 and axle portions 52 for each outer hand rim 80, 82, and lazy tongs 58 comprise means connecting the outer hand rims together so that manual rotation of one outer hand rim will rotate the other hand rim. It is also apparent that the inner hand rims 72, 76 may be used to independently freely rotate their associated wheels 36, 38 on axle portions 52.

Drive 10 also includes a first coupling means 94 for selectively, releasably coupling the first outer hand rim 80 to the first inner hand rim 72 and second coupling means 96 for selectively, releasably coupling the second outer hand rim 82 to the second inner hand rim 76. The coupling means 94, 96 each includes an aperture flange 98 which is affixed to an associated one of the hubs 60 on the drive wheels 36, 38. The coupling means 94, 96 also includes a fingered hub 100 slidably mounted on an associated one of the hubs 84 and having a plurality of bifurcated fingers, like the ones shown at 102, 104 adapted to either engage the spokes 90, 92, as shown for the first outer hand rim 80 or apertures (not shown) in an associated one of the flanges 98, as shown for the second outer hand rim 82. Each fingered hub is biased axially toward the inboard end 56 of its axle portion 52 by a compression spring 106 having a first end 108 engaging hub 100 and a second end 110 engaging a washer 112 held against an associated one of the hubs 84 by a nut 114 threadedly engaging an associated one of the outboard ends 54 of axle portions 52.

Operation of the first embodiment of the present invention will be readily understood. If the occupant of vehicle 12 has two good arms and hands, the fingered flanges 94, 96 may be positioned as shown for the flange 94 FIG. 2 so that both flanges 94, 96 will be disconnected from drive wheels 36, 38. The occupant may then grasp hand rims 72, 76, to manually drive wheels 36, 38 directly.

If the occupant of vehicle 12 has the use of only his right hand and arm, the flange 96 may be positioned as shown in FIG. 2 so that fingers 102, 104 will engage apertured flange 98 to connect the right hand hub 84 to hub 60 of wheel 38 through spokes 90, 92 of the second outer hand rim 82, fingers 102, 104 and apertured flange 98. Fingered flange 94 may be positioned as shown in FIG. 2 where it is disconnected from hub 60. The occupant may then simultaneously grasp hand rims 72, 80 and propel vehicle 12 by imparting rotation directly to drive wheel 36 and indirectly to drive wheel 38. Drive wheel 38 is driven by the first outer hand rim 80 through spokes 90, 92, hub 84, pin 86, the left hand axle portion 52, lazy tongs 58, the right hand axle portion 52, pin 86, hub 84, spokes 90, 92, for hand rim 82, fingers 102, 104 for fingered hub 96, apertured disc 98, hub 60, spokes 66 and rim 68 of drive wheel 38.

Vehicle 12 may be propelled by the left hand of the occupant by positioning fingered flange 96 so that fingers 102, 104 engage spokes 90, 92 and by positioning fingered flange 94 so that fingers 102, 104 pass through the apertures (not shown) in apertured flange 98 for drive wheel 36.

The second embodiment of the present invention operates in the same manner as the first embodiment except that the manual drive is connected to the drive wheels of a vehicle (not shown) by belts or the like so that the manual drive need not be located directly on the drive wheels, as in the first embodiment. The second embodiment will be described in connection with FIGS. 3, 4 and 5 wherein axle portions 52 in the first embodiment may be replaced with a single axle 52A having outboard ends 54A which may carry hubs 84, first and second coupling means 94, 96, compression springs 106, washers 112, nuts 114, and spokes 90, 92 identical to those shown and described in connection with the first embodiment.

The second embodiment also includes suitable frame members 20A to which the bearing races 48 and the bearings 50 may be connected for rotatably supporting axle 52A. A hub 60A may then be rotatably mounted on axle 52A adjacent each outboard end 54A by suitable bearings 62A, 64A. The right hand hub 60A carries a pulley 36A and the left hand hub 60A carries a pulley 38A about which belts 116, 118, respectively, may be trained for imparting rotation to the drive wheels on a wheeled vehicle (not shown).

Figure 4:
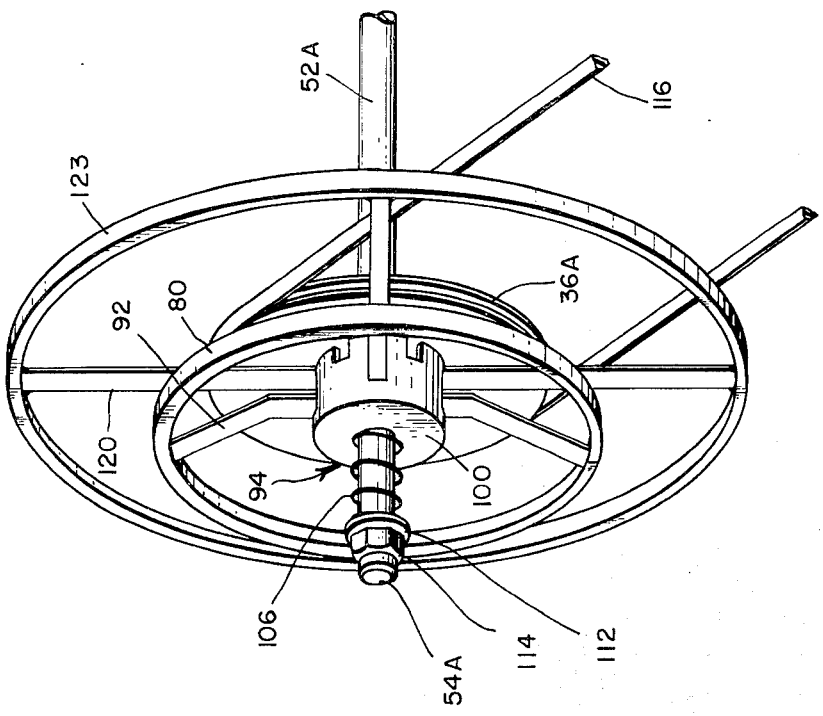
FIG. 4 is an enlarged, partial perspective view of the embodiment of FIG. 3 showing the parts in a first operating position.

Additionally, the right hand hub 60A may carry a plurality of spokes, like the ones shown at 120, 122, for connecting the right hand hub 60A to a first inner hand rim 123 (FIG. 4). The left hand hub 60A may carry a plurality of spokes, like the ones shown at 124, 126, for connecting the left hand hub 60A to a second inner hand rim (not shown). Alternatively, either hub 60A may be directly coupled to axle 52A by suitable means, like the spring-loaded pin 127 shown in FIG. 3 for the right hand hub 60A.

Referring now more particularly to FIGS. 4 and 5, the first coupling means 94 may be selectively, releasably coupled to the first outer hand rim 123 moving the coupling means 94 axially toward washer 112 and rotating the coupling means to either engage spokes 90, 92 or spokes 120, 122.

From the foregoing, it should be evident that there has herein been described a universal manual drive for a vehicle having a pair of manually driven wheels which efficiently and reliably drives the driven wheels when an occupant of the vehicle has the use of both hands, only the right hand, or only the left hand.

Although exemplary embodiments of the invention have been shown and described, changes and modifications and other embodiments of the invention may be made by one having ordinary skills in the art without necessarily departing from the spirit and scope of the invention.

What is claimed is:

1. A universal manual drive for a vehicle having a pair of manually driven wheels, comprising:
    first and second pairs of inner and outer hand rims;
    first means mounting said first pair of hand rims on said vehicle in such a position that said first pair of hand rims will be accessible to the left hand and arm of an occupant of said vehicle;
    second means mounting said second pair of hand rims on said vehicle in such a position that said second pair of hand rims will be accessible to the right hand and arm of said occupant;
    first means connecting said outer hand rims together whereby manual rotation of one outer hand rim will rotate the other outer hand rim;
    second means connecting one of said inner hand rims to one of said manually driven wheels and the other of said inner hand rims to the other of said manually driven wheels for rotation by an associated one of said inner hand rims;

first coupling means for selectively, releasably coupling said first inner hand rim to said first outer hand rim; and second coupling means for selectively, releasably coupling said second inner hand rim to said second outer hand rim.

2. A universal manual drive as stated in claim 1 wherein said first connecting means comprises:

an axle shaft extending through each of said outer hand rims; and means non-rotatably connecting said outer hand rims to said axle shaft.

3. A universal manual drive as stated in claim 2 wherein said vehicle is a wheel-chair of the folding type and wherein said axle shaft includes a separate axle portion extending through each outer hand rim and a folding-tong-type connector connecting each axle portion together.

4. A universal manual drive as stated in claim 1 wherein said second connecting means comprises:

a pulley connected to each of said inner hand rims; and a belt connecting each pulley to an associate one of said driven wheels.

5. A universal manual drive as stated in claim 1 wherein each of said coupling means comprises:

locking finger means slidably mounted on said axle shaft outside of each of said outer hand rims; and spring means biasing each of said finger means axially along said axle shaft toward an associated one of said inner hand rims, whereby said finger means may be moved axially to be selectively locked into engagement with either its outer hand rim only or with both its inner and outer hand rims.

6. A universal manual drive for a wheel-chair having a pair of side frames and a pair of manually driven wheels, comprising:

a bearing carried by each of said frames;

a pair of axle portions each having an outboard end and an inboard end, the inboard end of each axle portion being journaled in an associated one of said bearings;

a foldable connector connecting said inboard ends of said axle portions together;

a hub rotatably mounting each of said driven wheels on an associated one of said axle portions intermediate its ends;

an inner hand rim connected to each driven wheel;

an apertured flange affixed to each hub adjacent the outboard end of an associated one of said axle portions;

an outer hand rim keyed to each axle portion outboard of said apertured flange;

a coupling member slidably mounted on the outboard end of each axle portion outboard of an associated one of said outer hand rims; and spring means on the outboard end of each axle portion outboard of said coupling members for biasing said coupling members into selective, releasable engagement with said outer hand rim and said apertured flange.

7. A universal manual drive as stated in claim 1 wherein at least one of said coupling means comprises pin means directly coupling an associated one of said wheels to said first connecting means.

* * * * *